United States Patent [19]

Ward

[11] Patent Number: 5,194,452
[45] Date of Patent: Mar. 16, 1993

[54] ACYLOXY ENDBLOCKED POLYETHERS HAVING IMPROVED HYDROLYTIC STABILITY

[75] Inventor: Andrew H. Ward, Sanford, Mich.

[73] Assignee: Dow Corning Corporation, Midland, Mich.

[21] Appl. No.: 888,061

[22] Filed: May 26, 1992

[51] Int. Cl.$^5$ .......................... C08J 9/00; C08G 77/60
[52] U.S. Cl. .................................... 521/112; 521/131; 521/155; 528/15; 556/479
[58] Field of Search .................. 521/112, 155, 131

[56] References Cited

U.S. PATENT DOCUMENTS 4,042,643  8/1977  Creasey ............................. 428/447
4,614,675  9/1986  Ona .................................. 427/387

*Primary Examiner*—Morton Foelak
*Attorney, Agent, or Firm*—Robert L. McKellar

[57] ABSTRACT

The invention disclosed herein deals with acyloxy endblocked polyethers having improved hydrolytic stability. This invention also deals with polysiloxane-polyoxyalkylene copolymers having improved hydrolytic stability and, with compositions which include the polysiloxane-polyoxyalkylene copolymers in the presence of water, and to methods for use of the polysiloxane-polyoxyalkylene copolymers to prepare polyurethane foams.

4 Claims, No Drawings

ACYLOXY ENDBLOCKED POLYETHERS HAVING IMPROVED HYDROLYTIC STABILITY

This invention deals with acyloxy endblocked polyethers having improved hydrolytic stability. This invention also deals with polysiloxane-polyoxyalkylene copolymers having improved hydrolytic stability and, with compositions which include the polysiloxane-polyoxyalkylene copolymers in the presence of water, and to methods for use of the polysiloxane-polyoxyalkylene copolymers to prepare polyurethane foams.

BACKGROUND OF THE INVENTION

The polyethers disclosed in this invention are comprised of ethylene oxide and propylene oxide components which are endblocked with an acyloxy group. Typically, the precursors to such materials are hydroxy endblocked by virtue of the process by which they are manufactured. In many applications for these materials, the carbinol functionality at the ends of the polymer chains are required to be capped in order to reduce the reactivity of the polymers in certain reactive systems. Many of these materials are capped with ether groups, such as methyl ether; isocyanates, such as toluene monoisocyanate; acyloxy groups, such as acetoxy, and the like.

The prior art, especially in the castable polyurethane resin, and polyurethane foam art, is replete with examples of these materials that are in the form of polysiloxane-polyoxyalkylene copolymers. The methods and materials used in capping the various polysiloxane-polyoxyalkylene copolymers are known as well.

In the polyurethane foam art, there is a special problem associated with the use of polyethylene-polypropylene copolymers as the organic segment of the polysiloxane-polyoxyalkylene copolymers. The usual procedures for manufacturing such materials results in a molecule in which one end of the polyoxyalkylene is capped with an unsaturated group such as vinyloxy or allyloxy in order to be able to react with methylhydrogenpolysiloxanes to create the polysiloxane-polyoxyalkylene copolymers. This is possible through hydrosilylation using noble metal catalysts, wherein the polysiloxanes have a certain number of methylhydrogensiloxane units in their molecules that react with the unsaturated groups of the polyoxyalkylenes to form Si—C bonds. Generally, the polyoxyalkylene copolymers can be capped before the hydrosilylation, or they can be capped after the hydrosilylation. Whatever the case, the normal preparative method for the unsaturated polyoxyalkylene copolymers is to coreact, for example, allyl alcohol with ethylene oxide and then react this polymer with propylene oxide such that the polyoxyalkylene copolymer molecule ends up with primarily secondary alcohol groups at its non-unsaturated end. In other methods, a random copolymer can be formed by reacting ethylene oxide, propylene oxide and allyl alcohol to provide a material having large numbers of carbinols on the secondary carbon atoms of the propylene glycol that is formed. Thus, one ends up with a molecule having the general formula:

wherein the majority of the carbinols on the molecule are attached to the secondary carbon atoms. So that the polyoxyalkylene materials could be reacted into polysiloxanes, and eventually participate in, for example, polyurethane foam production as surfactants, the carbinols are quite often endblocked as was indicated supra. A common endblocker used is acyloxy. The acyloxy endblocked materials have been used for over twenty years in aqueous systems in spite of the fact that they are susceptible to hydrolytic degradation. Thus, even though the problem was not overly severe, it still remained a problem. Materials made this way and stored in environments wherein even minute amounts, e.g. 100 ppm water is also present, tended to be unstable on the shelf and hence, could not be stored with any expectation that the materials would remain stable.

It was unexpectedly found by the inventor herein that when the polyoxyalkylene random copolymer was prepared so that a significant number of the carbinols are attached to primary carbon atoms, i.e. primarily on the oxyethylene segments of the copolymer, and then endcapped with acyloxy groups, a hydrolytically stable copolymer could be made. Such a material can be made by providing a random polyoxyalkylene copolymer, and then reacting it further with additional ethylene oxide or ethylene glycol to cap the polymer with primary carbinols, i.e. "enriched" random copolymers with ethylene oxide bound carbinols.

Further, when the polyoxyalkylene copolymers of this invention were used to prepare polysiloxane-polyoxyalkylene copolymers, this benefit was imparted to such materials, even when they were stored over long periods of time and at elevated temperatures as evidenced by the accelerated data provided in the examples.

PRIOR ART

The inventor herein believes that no such materials have been made available prior to the disclosure herein. However, there is disclosed in U.S. Pat. No. 4,042,643, issued Aug. 16, 1977 to Creasey, et al, a polysiloxane-polyoxyalkylene copolymer having the following formula:

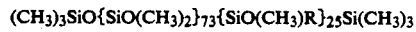

wherein R is —(CH$_2$)$_3$O{CH$_2$(CH$_3$)CHO}$_3$CH$_2$CH$_2$OCH$_3$. This material does not anticipate nor make obvious the materials of the instant invention because of the fact that the material is a block copolymer and, also, the primary carbinol is ether capped, not acyloxy capped, and it was found that these materials do not work very well in the end use applications of this invention.

A further disclosure is made in U.S. Pat. No. 4,614,675, issued on Sep. 30, 1986 to Ona, et al, wherein at the middle of the page bridging columns 5 and 6, second formula, there is shown an acetoxy endblocked material which is an ethoxy endblocked polydimethylsiloxane bearing trimethylsiloxyethane pendant groups, and a separate pendant group which is illustrated as CH$_3$CO$_2$(EO)$_{30}$(PO)$_{30}$(CH$_2$)$_3$—. The inventor herein suggests that this material was never prepared, nor was it in hand, and that the disclosure of the specific arrangement of the acetoxy group on the ethylene oxide segment was merely a result of the arrangment of the chemical formulae on the paper. The inventor herein believes that this illustration is based on an alphabetized scheme moving from left to right on the paper and does not teach a random (EO)(PO) (ethylene oxide-propylene oxide) copolymer enriched with terminal ethylene oxide carbinols. In support of this proposition, reference is made to column 4 of the same patent, lines 44 et seq. in which the patentees clearly spell out that the polymers of their invention are —R'O(C$_2$H$_4$O)$_d$(C$_3$H$_6$O)$_c$R'' (cf. line 49), and in addition, all of the other (EO)(PO) copolymers that are disclosed therein are shown as having the capping groups on the propylene oxide, not on ethylene oxide.

THE INVENTION

Thus, what is disclosed and claimed herein as the invention are acyloxy endblocked polyether random copolymers having improved hydrolytic stability; polysiloxane-polyoxyalkylene copolymers prepared from the polyethers and also having improved hydrolytic stability; compositions which comprise such polysiloxane-polyoxyalkylene copolymers in the presence of water, and methods of preparing polyurethane foams using the polysiloxane-polyoxyalkylene copolymers as surfactants.

More specifically, this invention deals with a polyoxyalkylene random copolymer comprising polyoxyethylene units and polyoxypropylene units and having the general formula $$CH_2=CHCH_2O(CH_2(CH_3)CHO)_z(CH_2CH_2O)_w(C=O)R''$$

wherein R'' is selected from a group consisting of alkyl radicals having from 1 to 6 carbon atoms, z has a value of 1 to 50, and w has a value of 1 to 50; wherein the ratio of z to w is in the range of 0.1 to 10:1, there being at least 40 mole percent of the molecules having —(C=O)R'' bonded directly to primary carbon atoms in the polyoxyethylene units in the molecule.

This invention further deals with polysiloxane-polyoxyalkylene copolymers selected from polysiloxane-polyoxyalkylene copolymers having the following general formula

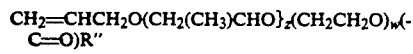  (i)

and

  (ii)

wherein R is —(C$_n$H$_{2n}$)O{CH$_2$(CH$_3$)CHO}$_z$(CH$_2$CH$_2$O)$_w$(C=O)R'', wherein R'' is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50; wherein the ratio of x to y is in the range of 0.1 to 10:1, and the ratio of z to w is in the range of 0.1 to 10:1, there being at least 40 mole percent of the molecules having —(C=O)R'' bonded directly to primary carbon atoms in the polyoxyethylene units in the molecule.

Still further, this invention deals with a process of preparing polyurethane foams said method comprising: (I) mixing a formulation comprising: (a) at least one reactive diisocyanate; (b) at least one reactive polyol; (c) at least one catalyst; (d) an organic blowing agent, and (e) a polysiloxane-polyoxyalkylene copolymer selected from the group having the following general formula (i)  and (ii) 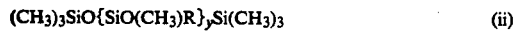

wherein R is a random copolymer comprising polyoxyethylene units and polyoxypropylene units and having the general formula

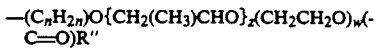

wherein R'' is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50; wherein the ratio of x to y is in the range of 0.1 to 10:1 and the ratio of z to w is in the range of 0.1 to 10:1, there being at least 40 mole percent of the molecules having —(C=O)R'' bonded directly to primary carbon atoms in the polyoxyethylene units in the molecule; (II) allowing the mixture to react and cure whereby a polyurethane foam is obtained.

This invention also deals with a second process for producing polyurethane foams, said process comprising: (I) mixing a formulation comprising: (a) at least one reactive diisocyanate; (b) at least one reactive polyol; (c) at least one catalyst; (d) water, and (e) a polysiloxane-polyoxyalkylene copolymer selected from the group having the following general formula (i)

 and (ii)

(CH$_3$)$_3$SiO{SiO(CH$_3$)R}$_y$Si(CH$_3$)$_3$ wherein R is a random copolymer comprising polyoxyethylene units and polyoxypropylene units and having the general formula

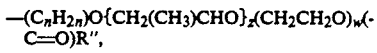, wherein R'' is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50; wherein the ratio of x to y is in the range of 0.1 to 10:1 and the ratio of z to w is in the range of 0.1 to 10:1, there being at least 40 mole percent of the molecules having —(C=O)R'' bonded directly to primary carbon atoms in the polyoxyethylene units in the molecule; (II) allowing the mixture to react and cure whereby a polyurethane foam is obtained.

This invention deals with yet another process for preparing polyurethane foams, the process comprising: (I) mixing a formulation comprising: (a) at least one reactive diisocyanate; (b) at least one reactive polyol; (c) at least one catalyst; (d) an organic blowing agent; (e) water, and (f) a polysiloxane-polyoxyalkylene copolymer selected from the group having the following general formula (i) (CH$_3$)$_3$SiO—{SiO(CH$_3$)$_2$}$_x$—{SiO(CH$_3$)R}$_y$Si(CH$_3$)$_3$ and (ii) (CH$_3$)$_3$SiO—{SiO(CH$_3$)R}$_y$Si(CH$_3$)$_3$ wherein R is a random copolymer comprising polyoxyethylene units and polyoxypropylene units and having the general formula —(C$_n$H$_{2n}$)O{CH$_2$(CH$_3$)CHO}$_z$—(CH$_2$CH$_2$O)$_w$(C=O)R'', wherein R'' is selected from a group consisting of alkyl radicals having from 1 to 6 carbon atoms n has a value of 2 to 8, x has a value of 1 to 500, y has a value of 1 to 500, z has a value of 1 to 50, and w has a value of 1 to 50; wherein the ratio of x to y is in the range of 0.1 to 10:1 and the ratio of z to w is in the range of 0.1 to 10:1, there being at least 40 mole percent of the molecules having —(C=O)R'' bonded directly to primary carbon atoms in the polyoxyethylene units in the molecule; (II) allowing the mixture to react and cure whereby a polyurethane foam is obtained.

This invention also deals with a hydrolytically stable composition comprising: (A) water, and (B) a polysiloxane-polyoxyalkylene copolymer selected from polysiloxane-polyoxyalkylenes copolymers having the following general formula $$(CH_3)_3SiO\{SiO(CH_3)_2\}_x\{SiO(CH_3)R\}_ySi(CH_3)_3 \quad (i)$$

and $$(CH_3)_3SiO\{SiO(CH_3)R\}_ySi(CH_3)_3 \quad (ii)$$

wherein R is a random copolymer comprising polyoxyethylene units and polyoxypropylene units and having the general formula $$-(C_nH_{2n})O\{CH_2(CH_3)CHO\}_z(CH_2CH_2O)_w(C=O)R'',$$

wherein R" is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50; wherein the ratio of x to y is in the range of 0.1 to 10:1 and the ratio of z to w is in the range of 0.1 to 10:1, there being at least 40 mole percent of the molecules having —(C=O)R" bonded directly to primary carbon atoms in the polyoxyethylene units in the molecule.

DETAILED DESCRIPTION OF THE INVENTION

One aspect of this invention are the polyoxyalkylene random copolymers having the general formula $$CH_2=CHCH_2O\{CH_2(CH_3)CHO\}_z(CH_2CH_2O)_w(-C=O)R''.$$

The polyoxyalkylene copolymers must be random in structure as it relates to the components —(CH$_2$C-H$_2$O)—, and —{CH$_2$(CH$_3$)CHO}—, as it has been reported to the inventor herein that block copolymers will not give the benefits in the end use application. As indicated above, one end of the molecules of this polyoxyalkylene copolymer is capped with an unsaturated moiety, such as vinyloxy or allyloxy, allyloxy being preferred. The other end of the molecule contains a polyoxyalkylene segment which is capped with a carbinol, and without this invention, the amount of polyoxyalkylene end groups that contain primary carbinols is limited to generally less than about 10 mole percent. The polyoxyalkylene random copolymers of this invention have a average molecular weight of about 160 to 4130 g/mole.

It should be understood by those skilled in the art that the number of primary hydroxyl groups present in the random copolymer must be such that at least 40 mole percent of the molecules have carbinols bonded directly to primary carbon atoms in the polyoxyethylene units in the molecule.

The majority of the primary hydroxyl groups are those derived from the ethylene oxide residues but certain of the hydroxyl groups derived from propylene oxide can also be primary depending upon the manner in which the oxirane ring of the propylene oxide opens up in the formation of the copolymer. In this invention, the polyoxyalkylene random copolymer which is "enriched", contains at least forty mole percent of end groups having primary carbinols before it is endcapped. The primary carbinols are reacted with various acylates in order to cap the carbinols with an acyloxy group. For purposes of this invention, the formula, R" is the alkyl radical of an acyloxy endblocking or endcapping material and these materials are selected from a group consisting of alkyl radicals having from 1 to 6 carbon atoms. Preferred for this invention are the methyl, ethyl, propyl and butyl radicals. Most preferred is the methyl radical. The molecular weight of the polyoxyalkylene random copolymer is made up primarily of the ethylene oxide and the propylene segments, and such molecular weight is indicated by the subscripts w and z, respectively. The subscript z has a value of 1 to 50, and w has a value of 1 to 50; wherein the ratio of z to w is in the range of 0.1 to 10:1. Such copolymers include for example: $CH_2=CHCH_2O(CH_2CHCH_3O)_{18}(CH_2C-H_2O)_{18}C(O)CH_3$, and the like.

As indicated above, this invention also deals with polysiloxane-polyoxyalkylene copolymers, which are prepared by utilizing the polyoxyalkylene random copolymers described above. The materials are prepared by the well-known hydrosilylation in which the polysiloxanes containing hydrogen attached to silicon atoms, for example, $(CH_3)_3SiO\{SiO(CH_3)H\}_1Si(CH_3)_3$; $(CH_3)_3SiO\{SiO(CH_3)_2\}_1—\{SiO(CH_3)H\}_1Si(CH_3)_3$; $(CH_3)_3SiO\{SiO(CH_3)_2\}_{3.7}\{SiO(CH_3)H\}_{9.5}—Si(CH_3)_3$; $(CH_3)_3SiO\{SiO(CH_3)_2\}_{1.9}\{SiO(CH_3)H\}_{13.3}Si(CH_3)_3$; $(CH_3)_3SiO\{SiO(CH_3)_2\}_{2.1}\{SiO(CH_3)H\}_{22.8}Si(CH_3)_3$; $(CH_3)_3SiO—\{SiO(CH_3)_2\}_{3.3}\{SiO(CH_3)H\}_{73}Si(CH_3)_3$; $(CH_3)_3SiO\{SiO(CH_3)_2\}_{8.0}—\{SiO(CH_3)H\}_{87}Si(CH_3)_3$, and $(CH_3)_3SiO\{SiO(CH_3)_2\}_{19}-\{SiO(CH_3)H\}_{13.9}Si(CH_3)_3$, are used herein. The silicon bound hydrogen is reacted with the unsaturated terminal of the polyoxyalkylene random copolymers under the catalytic influence of platinum, rhodium, or the like. These reactions are well known in the art and a detailed description of the reaction will not be set forth herein.

The polysiloxane portion of the copolymer is comprised of trialkylsilyl endblocking units, and for purposes of this invention, the body of the siloxane chain is comprised of polydimethylsiloxane units and methylhydrogenpolysiloxane units having the general formula:

$$(CH_3)_3SiO\{SiO(CH_3)_2\}_x\{SiO(CH_3)H\}_ySi(CH_3)_3 \text{ or}$$

$$(CH_3)_3SiO\{SiO(CH_3)H\}_ySi(CH_3)_3$$

wherein x has an average value of 1 to 500, and y has an average value of 1 to 500. Further, the ratio of x to y is in the range of 0.1 to 10:1.

The polyxiloxane-polyoxyalkylene copolymers are useful as surfactants in the preparation of polyurethane foams.

COPOLYMER SURFACTANTS

All of the surfactants used in the examples were prepared by hydrosilylation of the allyloxy, or vinyloxy endblocked polyethers, using platinum as the catalyst, according to standard procedures known in the art.

EXAMPLE 1

A set of samples were subjected to an accelerated hydrolysis test to show the hydrolytic stability of the materials of this invention.

A material, $CH_2=CHCH_2O(CH_2CHC-H_3O)_{18}(CH_2CH_2O)_{18}C(O)CH_3$ was prepared. Samples of this material were placed in a 92° C. oven and the acid content was measured periodically over a period of time with the following results.

| TIME Min. | ACID NO. mg. KOH/ gram sample | TOTAL ACID ppm |
|---|---|---|
| 0 | .0136 | 14.5 |
| 17 | .0136 | 14.5 |
| 55 | .0194 | 20.7 |
| 97 | .0360 | 38.5 |
| 120 | .0160 | 17.3 |
| 182 | .0564 | 60.0 |
| 245 | .0344 | 36.8 |
| 328 | .0814 | 86.9 |
| 360 | .0702 | 75.0 |
| 1260 | .0570 | 61.0 |
| 2747 | .0496 | 53.0 |
| 4190 | .07197 | 77.0 |

These results show that the rate was 11.2 ppm/hr. and it plateaued around 80 ppm, while a like sample, not falling within the scope of this invention had an initial rate of 37 ppm/hr. and a plateau at about 500 ppm. It was speculated that the erratic acid values were caused by the use of glass vials having plastic tops which may have leaked acetic acid through the caps as they were heated in this accelerated test. However, the data shows the desired trend leading to the conclusions regarding the benefits recited herein.

EXAMPLE 2

Hydrolysis rates were measured on the material of example 1 and it was compared with other similar materials with varying amounts of ethylene oxide groups containing acetoxy groups.

| SAMPLE | HYDROLYSIS RATE |
|---|---|
| A | 11.2 ppm/hr. |
| B | 37.3 ppm/hr. |
| C | 15.2 ppm/hr. |
| D | 12.3 ppm/hr. |

Sample B is a material of the prior art. Sample A is the inventive material of example 1. Sample C is a material of this invention having 80% ethylene oxide ends covered with acetoxy groups, and Sample D is a material of this invention having 60% ethylene oxides ends covered with acetoxy groups.

In spite of the fact that the hydrolysis rate does not line up with very well with the percentage of ethylene oxide ended polymers, it is clear that the hydrolysis rates of the materials of the instant invention are lower than those of the prior art material.

EXAMPLE 3

Preparation of a flexible polyurethane foam using $(CH_3)_3SiO\{(CH_3)_2SiO\}_{103}(CH_3RSiO)_{10}Si(CH_3)_3$ wherein R is $—(CH_2)_3O(CH_2CHCH_3O)_{18}(CH_2CH_2O)_{18}C(O)CH_3$.

The polyether was reacted with a polydimethylsiloxane substituted with 0.117 weight percent hydrogen attached to silicon atoms and having a viscosity of 155 centistokes.

The resulting polysiloxane-polyoxyalkylene copolymer was used in a test for flexible polyurethane foam as follows:

1. 107.8 g of premix consisting of
   4.2 weight percent water
   92.7 weight percent of polyol 235-048, a product of Dow Chemical, Midland Mich.
   3.0 weight percent of methylene chloride
   0.1 weight percent of Dabco BL11, an amine catalyst product of Air Products & Chemicals.
2. 0.6 g of the polysiloxane-polyoxyalkylene produced above.
3. 0.4 g of T-10 catalyst, a tin catalyst product of Air Products & Chemicals.
4. 53.1 g of toluene diisocyanate.

The components 1 to 4 were thoroughly mixed and a flexible polyurethane foam was produced having a foam height of 233.7 mm. The average for production lots having the same formulation, but made with acyloxy polyethers not of this invention is 233.2 mm. This shows that the ability of the surfactant to perform in a polyurethane formulation is essentially unaffected.

That which is claimed is:

1. A process of preparing polyurethane foams said method comprising:
   (I) mixing a formulation comprising:
      (a) at least one reactive diisocyanate;
      (b) at least one reactive polyol;
      (c) at least one catalyst;
      (d) an organic blowing agent, and
      (e) a polysiloxane-polyoxyalkylene copolymer selected from the group having the following general formula

$(CH_3)_3SiO\{SiO(CH_3)_2\}_x\{SiO(CH_3)R\}_ySi(CH_3)_3$    (i)

and

$(CH_3)_3SiO\{SiO(CH_3)R\}_ySi(CH_3)_3$    (ii)

wherein R is a random copolymer comprising polyoxyethylene units and polyoxypropylene units and having the general formula $—(C_nH_{2n})O\{CH_2(CH_3)CHO\}_z(CH_2CH_2O)_w(C=O)R''$, wherein R'' is selected from a group consisting of alkyl radicals having from 1 to 6 carbon atoms,
n has a value of 2 to 8,
x has a value of 1 to 500,
y has a value of 1 to 500,
z has a value of 1 to 50, and
w has a value of 1 to 50;
wherein the ratio of x to y is in the range of 0.1 to 10:1 and the ratio of z to w is in the range of 0.1 to 10:1, there being at least 40 mole percent of the molecules having—(C=O)R'' bonded directly to primary carbon atoms in the polyoxyethylene units in the molecule;
   (II) allowing the mixture to react and cure whereby a polyurethane foam is obtained.

2. A hydrolytically stable composition comprising
   (A) water, and
   (B) a polysiloxane-polyoxyalkylene copolymer selected from polysiloxane-polyoxyalkylene copolymers having the following general formula

$(CH_3)_3SiO\{SiO(CH_3)_2\}_x\{SiO(CH_3)R\}_ySi(CH_3)_3$    (i)

and

$(CH_3)_3SiO\{SiO(CH_3)R\}_ySi(CH_3)_3$    (ii)

wherein R is a random copolymer comprising polyoxyethylene units and polyoxypropylene units and having the general formula —($C_nH_{2-n}$)O{$CH_2(CH_3)CHO$}$_z$($CH_2CH_2O$)$_w$(C=O)R″, wherein R″ is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50;

wherein the ratio of x to y is in the range of 0.1 to 10:1, there being at least 40 mole percent of the molecules having —(C=O)R″ bonded directly to primary carbon atoms in the polyoxyethylene units in the molecule.

3. A process of preparing polyurethane foams said method comprising:

(I) mixing a formulation comprising:

(a) at least one reactive diisocyanate;

(b) at least one reactive polyol;

(c) at least one catalyst;

(d) water, and (e) a polysiloxane-polyoxyalkylene copolymer selected from the group having the following general formula

and

wherein R is a random copolymer comprising polyoxyethylene units and polyoxypropylene units and having the general formula —($C_nH_{2-n}$)O{$CH_2(CH_3)CHO$}$_z$($CH_2CH_2O$)$_w$(C=O)R″, wherein R″ is selected from a group consisting of alkyl radicals having from 1 to 6 carbon atoms, n has a value of 2 to 8, x has a value of 1 to 500, y has a value of 1 to 500, z has a value of 1 to 50, and w has a value of 1 to 50;

wherein the ratio of x to y is in the range of 0.1 to 10:1 and the ratio of z to w is in the range of 0.1 to 10:1, there being at least 40 mole percent of the molecules having—(C=O)R″ bonded directly to primary carbon atoms in the polyoxyethylene units in the molecule;

(II) allowing the mixture to react and cure whereby a polyurethane foam is obtained.

4. A process of preparing polyurethane foams said method comprising:

(I) mixing a formulation comprising:

(a) at least one reactive diisocyanate;

(b) at least one reactive polyol;

(c) at least one catalyst;

(d) an organic blowing agent;

(e) water, and (f) a polysiloxane-polyoxyalkylene copolymer selected from the group having the following general formula

and

wherein R is a random copolymer comprising polyoxyethylene units and polyoxypropylene units and having the general formula —($C_nH_{2-n}$)O{$CH_2(CH_3)CHO$}$_z$($CH_2CH_2O$)$_w$(C=O)R″, wherein R″ is selected from a group consisting of alkyl radicals having from 1 to 6 carbon atoms n has a value of 2 to 8, x has a value of 1 to 500, y has a value of 1 to 500, z has a value of 1 to 50, and w has a value of 1 to 50;

wherein the ratio of x to y is in the range of 0.1 to 10:1 and the ratio of z to w is in the range of 0.1 to 10:1, there being at least 40 mole percent of the molecules having —(C=O)R″ bonded directly to primary carbon atoms in the polyoxyethylene units in the molecule;

(II) allowing the mixture to react and cure whereby a polyurethane foam is obtained.

* * * * *